United States Patent [19]

Meacham et al.

[11] 3,946,283

[45] Mar. 23, 1976

[54] PANELBOARD FRONT HAVING CONCEALED CLAMPS

[75] Inventors: James F. Meacham, Hazlet; Louis R. Notte, Hillside, both of N.J.

[73] Assignee: Federal Pacific Electric Company, Newark, N.J.

[22] Filed: Aug. 19, 1974

[21] Appl. No.: 498,467

[52] U.S. Cl. ............................................. 317/120
[51] Int. Cl.² ....................................... H02B 1/08
[58] Field of Search ..... 317/101 CB, 112, 119, 120; 174/58, 66, 67; 49/163, 168, 169, 171; 292/42, 43, 55, 145, 256.73, 256.5, 301; 220/3, 8, 29, 55 L, 55.1; 312/223, 291, 292

[56] References Cited
UNITED STATES PATENTS

| | | | |
|---|---|---|---|
| 3,333,158 | 7/1967 | Speck | 317/120 |
| 3,339,124 | 8/1967 | Jorgensen | 317/120 |
| 3,465,914 | 9/1969 | Pierson, Jr. | 317/119 |
| 3,777,224 | 12/1973 | Meacham | 317/120 |

Primary Examiner—Gerald P. Tolin

[57] ABSTRACT

A panelboard front assembly including a trim plate having an opening for exposing a panel assembly mounted in a box, clamping bars slidably attached to the trim plate for engaging flanges of the box, and a door attached to the trim plate which conceals the clamping bars and the associated adjusting means when closed. In the illustrated example, side rabbets are provided on the trim plate and the clamping bars slide in openings in the rabbets and have adjusting screws which slide in slots in the rabbets. The clamping bars are further spring-loaded toward the open position by springs situated proximate the adjusting screws.

7 Claims, 4 Drawing Figures

3,946,283

PANELBOARD FRONT HAVING CONCEALED CLAMPS

BACKGROUND OF THE INVENTION

This invention relates to electrical panelboards which incorporate an internal electrical subassembly of various devices, such as circuit breakers or fuses and an enclosure. More particularly, the invention relates to a panelboard equipped with concealed clamps for attaching the front or trim to a wall-mounted sheet metal box or the like.

In the prior art, a variety of different means were used for fastening a "trim" or front onto wall-mounted panel assemblies. These panels usually include a sheet metal box which is mounted in a wall so as to be recessed from the front surface of the wall or to be flush with the surface of the wall. A panelboard front or "trim," together with a suitable door, is provided for completing the enclosure of the panel assembly and allows access to the control elements of the circuit devices through an opening in the front that is normally covered by the door.

Such panelboard fronts should be easily attached and removed from position, preferably by one person, for access to the devices and terminals of the panel when necessary. It is desirable that the means which attaches the panelboard front or trim to the panel assembly be concealed when the door of the assembly is closed and locked to prevent unauthorized access to the interior. It is also desirable that the means for fastening the panelboard front to the assembly be adjustable or otherwise adapted to engaging panelboard boxes which are recessed from the front surface of the wall at different depths or in irregular fashion, whether canted laterally or unaligned vertically with the surface of the wall. Stated another way, the attachment means for the panelboard front should be adjustable to assure that the trim will be flush with the wall when it is secured in place, both for satisfactory appearance and for rendering the panel tamper proof for maximum security in corridors and other wall areas exposed to public traffic.

It is known to attach panelboard fronts to a panel box by means that is covered by the door when it is closed. An example is Wills, U.S. Pat. No. 2,871,284, in which the front is attached to the panel box by sufficiently long screws which are screwed into an arm on a bracket that is attached to the rear of the box. Various other techniques involving the use of relatively complicated clamping mechanisms have been developed in which the manipulative elements thereof are covered by the door when closed. Such clamps usually include two or more members pivoted together so that one engages the trim and another is disposed for engaging the flange of the box as a clamp. Such arrangements usually require a long threaded screw for providing sufficient adjustability for recessed panelboard boxes or a rotatable clamp member which can be rotated out of clamping position so that they will clear the flanges of the box when the panelboard front is initially placed in position, or when it is being removed.

SUMMARY OF THE INVENTION

Accordingly, this invention provides a panelboard front having concealed clamps which include a bar or rod which is slidably attached to the trim plate or to a bracket or rabbet affixed thereto. The clamping bars are moved toward the center of the panel to the open position and are moved toward the edges of the panel to the closed position behind the flanges of the box. The side rabbets on the trim plate serve as both the retainer and the fulcrum for the clamping bars.

A means is provided for each clamp for tightening or locking it against the flange of the panelboard box once the clamp is moved into the closed position. The tightening means include screws or shafts threaded into or attached to the clamping bars, and which ride in slots in the side brackets or rabbets of the trim plate and also assist the sliding motion of the clamping bars. The bars in turn pass through openings or apertures in the side of the rabbets or brackets which limits the freedom of the bars to a sliding motion. Only a tool purchase such as a notch or screwdriver slot need be provided in the clamping bars which are of heavy gauge material. Alternatively, the slot for the shaft or screw of the tightening means can be in the clamp bars themselves rather than in the side rabbets or brackets.

The adjustment ends of the clamping bars are thus accessible through the opening in the trim plate when the door is open for easy installation and removal. Springs are provided at the tightening screws or shafts between the trim plate and the clamping bars to bias the bars away from the rear surface of the trim plate out of engagement with the flanges of the box and to frictionally retain the clamping bars in the open position once they have been moved toward the center of the trim plate opening.

DETAILED DESCRIPTION OF THE PREFERRED EMBODIMENTS

Figure 1:
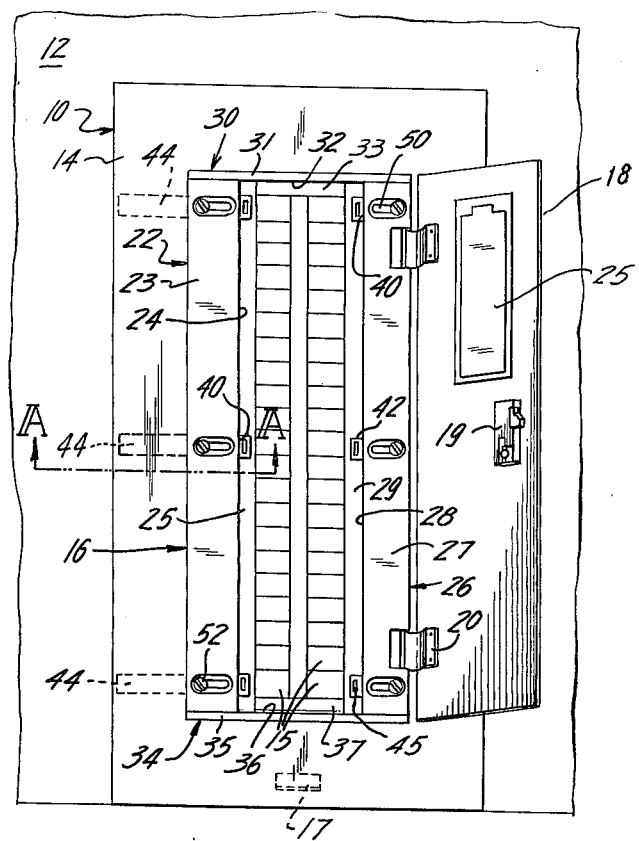
FIG. 1 is a front view of a panelboard front assembly of the invention mounted against a wall surface.

In the drawing of FIG. 1 there is shown a panelboard front 10 mounted against the surface of a wall 12 and including a trim 14 having an opening 16 therein and a door 18 formed to fit opening 16 therein and being attached to the trim by hinges 20. Two columns of circuit protective devices 15 such as circuit breakers, fuses or the like are exposed in opening 16 of the front. Also attached to trim plate 14 or formed integrally therewith are side brackets or rabbets 22 and 26 and top and bottom rabbets 30 and 34, respectively. The door 18 has a lock 19 mounted therein, and index record 25 attached to its rear surface. A trim rest 17 shown in phantom is attached to the rear surface of the trim plate 14.

Side rabbet 22 is angular and includes a face portion 23, a perpendicular portion 24 and a rear portion 25. Likewise, side rabbet 26 includes a face 27, a wall portion 28 and a rear portion 29. Top rabbet 30 includes a face 31, a wall 32 and a rear barrier 33. Bottom rabbet 34 includes a face 35, a wall 36 and a rear barrier 37. The rear portion or barriers of the rabbets prevent accidental access to the interior of the panel.

Side rabbets 22 and 26 have a number of openings or apertures 40 in the perpendicular walls 24 and 28 thereof for receiving the adjustment ends 42 of elongated clamp bars 44 shown in phantom at the upper and lower left positions. These openings 40 are only slightly wider than the clamp bars 44 and allow them to slide horizontally along their axes parallel to the trim plate 14 from a withdrawn position in which they are moved toward the center of the panel, to an extended or projected position in which they engage the side flanges of the box. The adjustment ends 42 of the sliding clamp bars 44 have screwdriver slots 45 therein so that the clamp bars may be easily retracted from the extended position prior to installing or upon removing the panelboard front assembly.

Side rabbets 22 and 26 also have slots 50 formed therein which are recessed for receiving adjustment screws 52 which screw into threaded holes 49 (not shown) in the clamp bars 44. The axis of the clamp bars 44 and of the sliding motion or travel thereof is thus determined by the position of the openings 40 in the perpendicular walls of the side rabbets and by the position of the slots 50 in the face portions of the side rabbets. The screws 52 are preferably of the captive or self-retaining type which cannot be removed to prevent inadvertent disassembly of the sliding clamp units. It is clear from the drawings that the clamping members are supported at least in part by screws 52.

Figure 2:
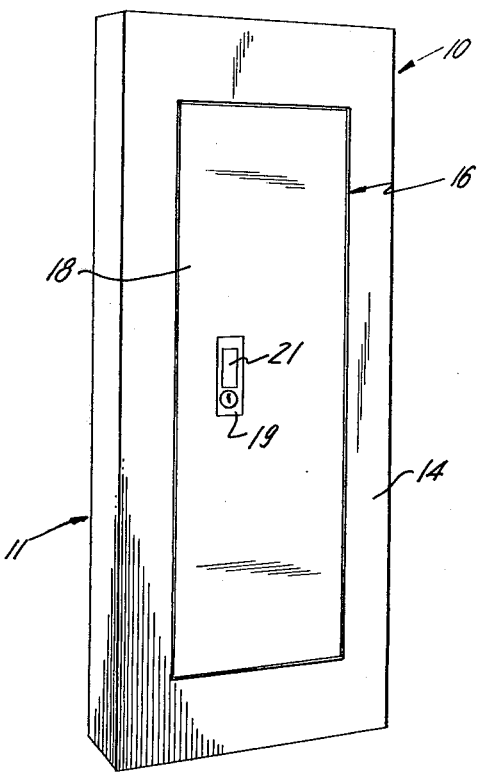
FIG. 2 is a pictorial view of a surface-mounted panelboard front and box assembly.

The drawing of FIG. 2 shows a panelboard front 10 of the invention mounted on a sheet metal box 11 which in turn may be mounted on the surface of the wall, on brackets or in any other desired fashion. The trim plate 14 has an opening 16 therein in which door 18 fits when it is closed to conceal the means clamping the panelboard front to the sheet metal box 11, together with the devices of the panel itself which are enclosed by the entire assembly. A flush-mounted lock 19 is secured in the door and includes also a handle member 21 of the type which closes flush with the door. As may be seen, the entire front surface of the trim 10 is completely unbroken, as is the door 18 with the exception of the lock and handle assembly. Even the hinges 20 (not shown in FIG. 2) are of the hidden or concealed type so that no mounting or attachment hardware is visible or accessible on the panel assembly when the door is closed and locked. Of course the door or trim plate could be notched to accommodate a different type of hinge if desired. The entire assembly is thus highly secure in preventing unauthorized operation of the enclosed panel units or disturbance or tampering with them without possession of the key.

Figure 3:
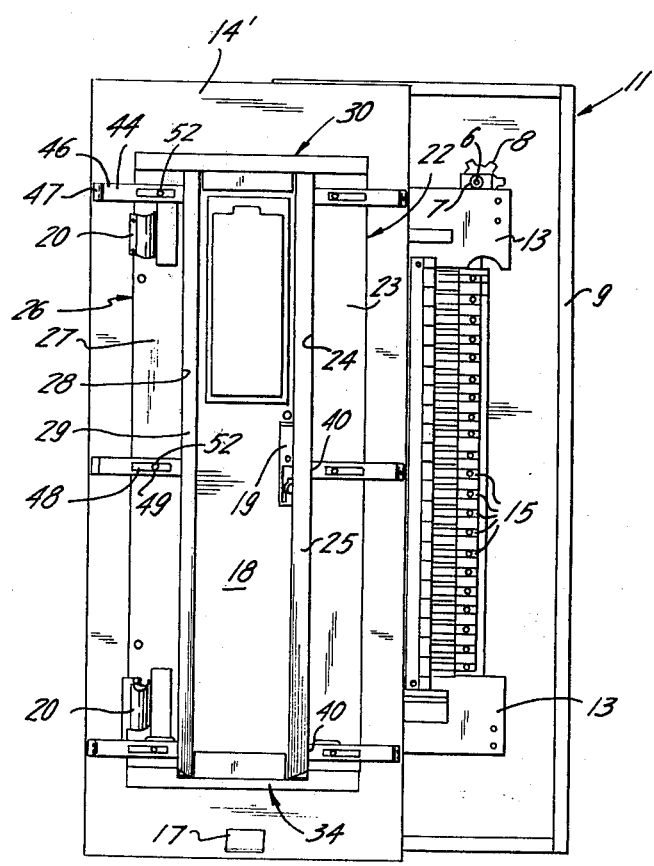
FIG. 3 is a view of the back of such a panelboard front and of a portion of a panel and box assembly behind it.

FIG. 3 shows the rear surface 14' of the trim plate of the panelboard front assembly in which the clamping bars 44 are clearly visible in their open position. As may be seen in the drawing, side brackets or rabbets 22 and 26 are affixed to the rear surface of the trim plate 14' as by spot welding or the like. Top and bottom rabbets 30 and 34 are then welded onto the rear surface of the trim and slightly overlap the side rabbets at the corners. Concealed type hinges 20 are affixed to the rear surface of side rabbet 26 and to the rear surface 14' of the trim plate as shown. The door 18 is shown in the closed position with lock 19 engaging side rabbet 22. Trim rest 17 is an angle shaped bracket affixed to the rear surface 14' of the trim plate.

Clamping bars 44 slide in openings 40 in the side rabbets 22 and 26 and have strengthening ribs 48 formed thereon in which are located tapped holes 49 into which self-retaining or captive screws 52 are threaded from the front at the slots 50 (not shown in FIG. 3), in side rabbets 22 and 26. A recess 46 toward the trim plate is formed near the ends of the clamping bars and the ends 47 of the clamp bars are turned away from the rear surface of the trim plate for easy engagement with the side flanges 9 of the box 11.

Circuit breakers 15, fuse pack type protective devices or the like are supported by brackets 13 mounted to the rear of the box 11 by bolts 6 and nuts 7. Sprocketlike washers 8 are threaded onto bolts 6 as leveling washers for adjusting the circuit breaker assembly for engagement with the rabbets of the trim.

Figure 4:
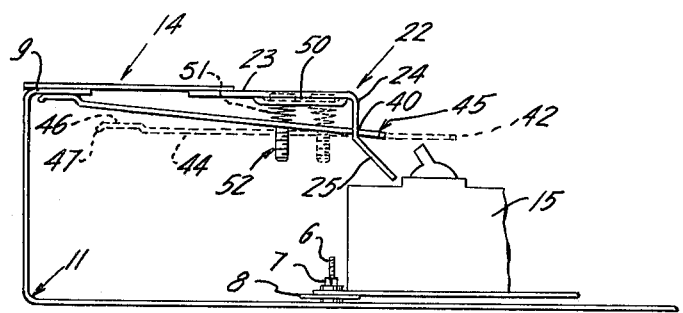
FIG. 4 is a sectional view of a portion of the panelboard taken at lines A—A in the drawing of FIG. 1.

FIG. 4 is a section of the drawing of FIG. 1 taken at lines A—A. A portion of box 11 having a side flange 9 is shown to which is mounted circuit breakers 15 by bolts 6, nuts 7 and tapped leveling washers 8. Trim plate 14 is laid against the flanges 9 of the box as when the box itself is mounted on the surface of a wall or the like. Side brackets or rabbets 22 include a face portion 23, a perpendicular portion 24 and a sloping rear portion 25 which is turned inwardly toward the circuit breakers 15 or other units of the panel.

The clamp bars 44 are shown in their closed position in solid lines and also in their open position in phantom lines. The adjustment end 42 of the clamping bar 44 clearly passes through openings or apertures 40 in the perpendicular portion 24 of side rabbet 22. Screwdriver slot 45 appears in the adjustment end 42 of the clamping bar. At the clamping end of the bar 44 is shown the recessed portion 46 and the backward turned end 47. The outside surface of the recess 46 on the clamping bar engages against the inside surface of the side flange 9 of the box when the clamp is moved to the closed position and tightened.

Clamps 44 are also retained and are adjusted or tightened by adjusting or locking screws 52 which thread into them and ride in slots 5 in the front face 23 of side rabbet 22. A coil spring 51 is shown positioned on the adjusting screw 52 between the recessed slot 50 of the face portion 23 of the side rabbet and the front surface of the clamping bar 44. This spring biases or spring loads the clamping bar toward the rear of the box out of engagement with the side flanges 9 of the box 11. Rotation of the screw from the front draws the clamp toward the front and against the side flanges 9 of the box 11 and thus tighten the trim plate against either the flanges 9 of the box or the surface of a wall when the box is recessed in the wall.

It is clear that the adjusting or locking screws 52 slide in slots 50 in the side brackets or rabbets from the open position to the closed position and vice versa. Also the spring frictionally engages the rear surface of the recessed slot 50 and also causes the rear surface of the clamping bar 44 near the adjustment end 42 to frictionally engage an edge of the opening or aperture 40 in the perpendicular portion 24 of the rabbet 22. These two frictional engagements of the spring and of the clamping bar retain the clamping bars 44 in the open position when they are retracted for convenient and easy placement of the trim plate into position against the box and to retain the clamping bars in the extended position, in readiness to be tightened against the box flanges.

Slots 50 are covered or blocked by the clamping bars 44 which translate behind them between the withdrawn and the extended positions and thus guard against entry of a tool through the slots 50 into the interior of the panel. And significantly, the slots are further closed or blocked when the clamping bars 44 are drawn against their rear edges in the closed or locked position of use.

In the broad aspect of this invention the slots 50 in the rabbets 22 and 26 can be eliminated if slots are formed in the clamping bars 44, as within the outlines of the illustrated strengthening ribs or ridges 48 thereon. Slots 50 in the side rabbets are then replaced by apertures for recessing tightening screws 52 and a nut is affixed to the rear of the clamp bars 44 so they may be tightened. In such an embodiment the clamping bars 44 should be thicker or wide for sufficient rigidity despite the slots formed in them for the sliding motion. Of course, the sliding clamp bars of either embodiment may be arranged to cooperate with either the side rabbets, or the top and bottom rabbets or with any three or with all of them as desired.

What we claim is:

1. A panelboard comprising a box having in-turned flanges on the front edges of the walls thereof, a sub-assembly of electrical devices in the box, and a trim unit largely covering the front of the box and having a portion defining an opening for exposing the devices in the box, a door for closing said opening and covering at least a portion of the trim unit surrounding said opening, said portion of the trim unit surrounding the opening cooperating with said electrical devices so as to block access to the interior of the panelboard when the door is open, and means for securing the trim unit to the box, characterized in that: the securing means includes elongated clamp bars at the back of the trim unit, each clamp bar having a clamping end portion said bars being slidable longitudinally between an extended position with its clamping end portion opposite one of said flanges and a withdrawn position with its clamping end portion clear of the flange and each clamp bar having a manipulating end portion directly accessable from the front of the trim unit in both said positions of the clamp bar, said securing means also having tightening means for each clamp bar including an operating means at the front of the trim unit for tightening the clamping end portion of the clamp bar against the flange, said tightening means and the trim unit jointly supporting the elongated clamp bar and defining the path for the longitudinal movement between said extended and withdrawn positions, said door in its closed position covering said tightening means and barring access to said manipulating end portion of the clamp bar.

2. A panelboard as in claim 1, wherein each said tightening means includes an elongated threaded member penetrating its clamp bar at a predetermined location along the length of the bar and wherein slots are formed in an area of the trim unit covered by the door in the closed position thereof, each said slot being penetrated by a said threaded member and accommodating shift of the elongated threaded member transverse to the length of the threaded member together with its related clamp bar as the latter is moved between its extended and withdrawn positions relative to the trim unit.

3. A panelboard as in claim 1, wherein a compression spring is disposed between said trim unit and each said clamp bar for displacing the related clamp bar rearwardly when the tightening means is released, each said spring additionally acting to restrain the related clamp bar frictionally in its positions of adjustment.

4. A panelboard as in claim 1, wherein the trim unit has an elongated opening which the clamp bar underlies and along which the clamp bar is slidably adjustable, the clamp bar extending generally along said elongated opening and substantially closing the opening in the tightened condition of the clamp bar.

5. A panelboard as in claim 1, wherein said tightening means of each clamp comprises a screw having a head at the front of the trim unit, and wherein the trim unit has, for each clamp bar, an elongated opening which the clamp bar underlies and along which the clamp bar is slidably adjustable, the clamp bar extending generally along said elongated opening and substantially closing the opening in the tightened condition of the clamp bar.

6. A panelboard as in claim 5, further including a compression coil spring surrounding the screw and confined between the clamp bar and the trim unit for displacing the clamp bar rearwardly when the tightening means is released, said spring additionally acting to restrain the clamp bar frictionally in its position of adjustment.

7. A panelboard as in claim 1, wherein said manipulating end portions of the clamp bars extend slidably through apertures in the trim unit near said opening, said apertures being only slightly larger than the transverse size of the clamp bars, the trim unit thereby providing sliding support for the clamp bars.

* * * * *